United States Patent
Bruno et al.

(10) Patent No.: US 10,707,962 B2
(45) Date of Patent: Jul. 7, 2020

(54) CONTROL OF AN OPTICAL TRANSMITTER IN A RADIO OVER FIBRE SYSTEM

(71) Applicant: Telefonaktiebolaget LM Ericsson (publ), Stockholm (SE)

(72) Inventors: Gianmarco Bruno, Genoa (IT); Luca Giorgi, Pisa (IT); Jeroen Nijhof, Genoa (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/754,456

(22) PCT Filed: Aug. 24, 2015

(86) PCT No.: PCT/EP2015/069379
§ 371 (c)(1),
(2) Date: Feb. 22, 2018

(87) PCT Pub. No.: WO2017/032406
PCT Pub. Date: Mar. 2, 2017

(65) Prior Publication Data
US 2018/0248626 A1    Aug. 30, 2018

(51) Int. Cl.
*H04B 10/07* (2013.01)
*H04B 10/2575* (2013.01)
(Continued)

(52) U.S. Cl.
CPC ... *H04B 10/25753* (2013.01); *H04B 10/0793* (2013.01); *H04B 10/07953* (2013.01);
(Continued)

(58) Field of Classification Search
CPC .............. H04B 10/25753; H04B 10/50; H04B 10/0793; H04B 10/07953; H04B 10/07; H04B 10/5057; H04B 10/2575
(Continued)

(56) References Cited

U.S. PATENT DOCUMENTS 4,893,300 A * 1/1990 Carlin ........................ H04J 1/14
                                                                398/32
5,212,700 A * 5/1993 Okita ....................... H01S 5/042
                                                                372/26
(Continued)

FOREIGN PATENT DOCUMENTS

CN          1701542 A      11/2005
CN          102369678 A      3/2012
(Continued)

OTHER PUBLICATIONS

3GPP, "3rd Generation Partnership Project; Technical Specification Group Radio Access Network; Evolved Universal Terrestrial Radio Access (E-UTRA); User Equipment (UE) conformance specification Radio transmission and reception Part 1: Conformance Testing ( . . . )", 3GPP TS 36.521-1 V9.3.0, Dec. 2010, 1-502.
(Continued)

*Primary Examiner* — Dibson J Sanchez
(74) *Attorney, Agent, or Firm* — Sage Patent Group (57) ABSTRACT

A radio over fibre system (5) comprises a base station (10, 20) with a first base station node (10) and a second base station node (20) connected by an optical communication link (30). At least one of the base station nodes (10, 20) comprises an optical transmitter (17, 23). A method of determining an operating parameter for the optical transmitter (17, 23) comprises receiving signal quality parameters for a plurality of user equipments (UE) served by the base station (10, 20). The method determines an operating parameter of the optical transmitter using the determined signal quality parameters of the plurality of user equipments (UE). The operating parameter of the optical transmitter can be a modulation parameter.

16 Claims, 10 Drawing Sheets

(51) Int. Cl.
*H04B 10/079* (2013.01)
*H04B 10/50* (2013.01)

(52) U.S. Cl.
CPC .............. *H04B 10/50* (2013.01); *H04B 10/07* (2013.01); *H04B 10/2575* (2013.01); *H04B 10/5057* (2013.01)

(58) Field of Classification Search
USPC ....... 398/9–38, 115–117, 140–172, 182–201
See application file for complete search history.

(56) References Cited

U.S. PATENT DOCUMENTS

| | | | | |
|---|---|---|---|---|
| 5,225,922 | A * | 7/1993 | Chraplyvy | H04J 14/0221 398/197 |
| 5,623,355 | A * | 4/1997 | Olsen | H01S 5/06835 398/162 |
| 5,936,754 | A * | 8/1999 | Ariyavisitakul | H04B 10/25758 398/103 |
| 5,995,256 | A * | 11/1999 | Fee | H04J 14/0241 398/1 |
| 6,157,475 | A * | 12/2000 | Dugan | H04B 10/25073 385/140 |
| 7,058,299 | B1 * | 6/2006 | Shah | H04B 10/503 398/16 |
| 7,099,597 | B2 * | 8/2006 | Saunders | H04B 10/25137 398/147 |
| 7,113,667 | B2 * | 9/2006 | Welch | B82Y 20/00 385/14 |
| 7,599,625 | B1 | 10/2009 | Harley et al. | |
| 7,733,825 | B2 * | 6/2010 | Kim | H04W 88/085 370/328 |
| 7,734,191 | B1 * | 6/2010 | Welch | B82Y 20/00 398/158 |
| 7,899,084 | B2 * | 3/2011 | Cho | H04J 3/0602 370/503 |
| 8,041,222 | B2 * | 10/2011 | Lee | H04B 10/25758 370/503 |
| 8,417,116 | B2 * | 4/2013 | Kim | H04B 10/25758 398/115 |
| 8,620,159 | B2 * | 12/2013 | Presi | H04B 10/25759 398/100 |
| 10,027,408 | B2 * | 7/2018 | Nishihara | H04B 10/40 |
| 2002/0048062 | A1 * | 4/2002 | Sakamoto | H04B 10/0775 398/30 |
| 2002/0154364 | A1 * | 10/2002 | Green | H04B 10/1125 398/121 |
| 2002/0176144 | A1 * | 11/2002 | Bergano | H04B 10/671 250/338.1 |
| 2003/0002125 | A1 * | 1/2003 | Fuse | H04Q 11/04 359/238 |
| 2003/0228151 | A1 * | 12/2003 | Niiho | H04B 10/25758 398/115 |
| 2004/0131365 | A1 * | 7/2004 | Lee | H04B 10/504 398/197 |
| 2004/0156644 | A1 * | 8/2004 | Yasue | H04B 10/5057 398/198 |
| 2004/0208514 | A1 * | 10/2004 | Zhang | H04B 10/0795 398/25 |
| 2005/0105901 | A1 * | 5/2005 | Yavor | H04B 10/0775 398/30 |
| 2005/0265730 | A1 * | 12/2005 | Yasue | H04B 10/503 398/183 |
| 2005/0266797 | A1 * | 12/2005 | Utsumi | H04B 10/25754 455/7 |
| 2006/0079290 | A1 * | 4/2006 | Seto | H01Q 3/2605 455/562.1 |
| 2007/0053692 | A1 * | 3/2007 | Hoshida | H01S 3/302 398/97 |
| 2009/0028578 | A1 | 1/2009 | Sun et al. | |
| 2009/0175629 | A1 * | 7/2009 | Liu | H04B 10/25133 398/147 |
| 2009/0257757 | A1 * | 10/2009 | Wan | H04B 10/504 398/202 |
| 2010/0239259 | A1 * | 9/2010 | Forghieri | H04J 14/007 398/79 |
| 2012/0063771 | A1 * | 3/2012 | Sugaya | H04B 10/2935 398/26 |
| 2012/0224849 | A1 | 9/2012 | Rylyakov et al. | |

FOREIGN PATENT DOCUMENTS

| | | |
|---|---|---|
| CN | 102611504 A | 7/2012 |
| CN | 203368488 U | 12/2013 |
| EP | 0476569 A2 | 3/1992 |
| EP | 1659812 A1 | 5/2006 |
| JP | 2014116679 A | 6/2014 |
| WO | 2004019524 A1 | 3/2004 |
| WO | 2010091004 A1 | 8/2010 |
| WO | 2012163419 A1 | 12/2012 |

OTHER PUBLICATIONS

Gaudino, R. et al., "A Novel Transmitter Architecture for Combined Baseband Data and Subcarrier-Multiplexed Control Links Using Differential Mach-Zehnder External Modulators", IEEE Photonics Technology Letters, vol. 9, No. 10, Oct. 1997, 1397-1399.

Ge, Shuai et al., "EVM Performance of a Radio-over-Fiber System for Multiband Wireless Signal Transmission", 2010 International Conference on Microwave and Millimeter Wave Technology (ICMMT), May 8-11, 2010, 1-4.

Tang, Pak Kay, "PER and EVM Measurements of a Radio-Over-Fiber Network for Cellular and WLAN System Applications", Journal of Lightwave Technology, vol. 22, No. 11, Nov. 2004, 2370-2376.

First Chinese Office Action for Chinese Patent Application No. 201580084107.1 dated Apr. 26, 2020, 16 pages (including English translation).

* cited by examiner

CONTROL OF AN OPTICAL TRANSMITTER IN A RADIO OVER FIBRE SYSTEM

TECHNICAL FIELD

The present disclosure is generally related to control of an optical transmitter which forms part of a radio over fibre system.

BACKGROUND

There is increasing interest in providing wireless systems in which the functions of a conventional base station are divided between two or more nodes. Baseband processing of wireless signals is performed by a digital unit (DU). Radio frequency processing is performed by a radio unit (RU). Radio frequency signals are transmitted and received by an antenna. The general term for this kind of system is Radio over Fibre (RoF). Signals are carried between the two nodes over an optical transmission link. Signals carried between the two nodes are called fronthaul signals.

In a digital Radio over Fibre system, the radio unit (RU) is located remotely from the digital unit (DU) and is typically called a Remote Radio Head (RRH). The DU and RRU are connected by an optical link. The DU outputs digital values, such as in-phase and quadrature (IQ) values. Data is carried over the optical link in digital form to the RRU. The RRU performs digital-to-analog conversion, and may perform RF functions, for example up-conversion to RF or filtering.

In an analog Radio over Fibre system, the radio unit (RU), and optionally, digital unit (DU), is located at a first node. The antenna is located at, or connected to, the second node. An optical link connects the first node to the second node. In the downlink direction, the first node sends signals over the optical link in analog form at radio frequency (RF) or an intermediate frequency (IF). At the second node, the analog domain signals are received over the optical link, converted to electrical form, and either sent directly to an antenna for transmission, or repositioned in frequency and then transmitted. In the uplink direction wireless signals are received at the antenna. The received signals may be used to modulate an optical transmitter or repositioned in frequency and then used to modulate an optical transmitter. At the first node, signals are converted to the electrical domain and then processed by the radio unit (RU) and digital unit (DU).

Radio over Fibre is particularly attractive where a large number of small cell sites are needed, such as in-building applications. RoF can also be used across larger areas as an alternative to conventional monolithic base stations and backhaul.

Radio over Fibre has an advantage of consolidating much of the base station signal processing at one location. This has an advantage of easier servicing and upgrading of the single location compared to visiting a large number of individual cell sites. The pooling of processing resources makes it possible to share resources between cell sites of the base station.

Analog Radio over Fibre further reduces the amount of equipment required at, or near to, the antenna. It can also reduce latency and reduce power consumption. While analog RoF has some advantages, transmission across the optical link in the analog domain means the system is more prone to the cumulative effects of noise and device nonlinearities, and crosstalk arising from impairments in the optical link.

SUMMARY

An aspect of the disclosure provides a method of determining an operating parameter of an optical transmitter in a radio over fibre system. The system comprises a base station comprising a first base station node and a second base station node connected by an optical communication link. At least one of the base station nodes comprises an optical transmitter. The method comprises receiving signal quality parameters for a plurality of user equipments served by the base station. The method comprises determining an operating parameter of the optical transmitter using the determined signal quality parameters of the plurality of user equipments.

An advantage of at least one example is use of information from the radio layer to determine an operating parameter of an optical transmitter. This can help to achieve an improved operating state of the transmitter without the need for additional monitoring equipment dedicated to monitoring the optical link. The improved operating state can reduce the effect of noise and nonlinearities at the optical transmitter.

The method may be applied to control of an optical transmitter only in the uplink/upstream direction, to control of an optical transmitter only in the downlink/downstream direction, or to control of optical transmitters in both the downlink/downstream direction and the uplink/upstream direction.

The plurality of user equipments served by the base station may be all, or a sub-set, of the total number of user equipments served by the base station.

The operating parameter of the optical transmitter may be a modulation parameter of the optical transmitter, such as modulation depth.

The method may be performed iteratively at spaced apart times. At an iteration of the method, determining an operating parameter of the optical transmitter comprises determining whether to increase or decrease a value of the operating parameter.

The determining of an operating parameter of the optical transmitter may use a change in value of signal quality parameters for a same user equipment. For example, the signal quality parameters may be inversely weighted based on their change in value. In another example, signal quality parameters may be removed if they have changed in value by an amount which is more than a threshold value, or threshold percentage or ratio.

The second base station node may comprise, or be connected to, a plurality of antennas. The method may receive signal quality parameters for a plurality of user equipments served by the plurality of antennas.

The optical transmitter may be located at the first node. The signal quality parameters may be indicative of a quality of a downlink wireless signal received at the user equipments from the base station.

The signal quality parameter may be received in a communication from the user equipment. For example, the user equipment may send the signal quality parameter in an uplink communication.

The signal quality parameter may be Channel Quality Indication (CQI).

The optical transmitter may be located at the second node. The signal quality parameter may be indicative of quality of an uplink wireless signal from the user equipment to the base station.

The signal quality parameter may be determined at the first node. The signal quality parameter may be determined at a digital unit (DU) of the first node.

The signal quality parameter may be Error Vector Magnitude, EVM.

An aspect of the disclosure provides a method of controlling an operating parameter of an optical transmitter in a radio over fibre system. The system comprises a base station comprising a first base station node and a second base station node connected by an optical communication link. At least one of the base station nodes comprises an optical transmitter. The method comprises determining an operating parameter of the optical transmitter as described or claimed herein. The method comprises controlling the optical transmitter using the determined operating parameter.

An aspect of the disclosure provides a controller for determining an operating parameter of an optical transmitter in a radio over fibre system. The system comprises a base station comprising a first base station node and a second base station node connected by an optical communication link. At least one the base station nodes comprises an optical transmitter. The controller comprises an input configured to receive signal quality parameters for a plurality of user equipments served by the base station. The controller comprises a computation module configured to determine an operating parameter of the optical transmitter using the determined signal quality parameters of the plurality of user equipments. The controller comprises an output configured to output the determined operating parameter of the optical transmitter.

An advantage of at least one example is use of information from the radio layer to determine an operating parameter of an optical transmitter. This can help to achieve an improved operating state of the transmitter without the need for additional monitoring equipment dedicated to monitoring the optical link. The improved operating state can reduce the effect of nonlinearities at the optical transmitter.

An aspect of the disclosure provides a controller for determining an operating parameter of an optical transmitter in a radio over fibre system. The system comprises a base station comprising a first base station node and a second base station node connected by an optical communication link. At least one of the base station nodes comprises an optical transmitter. The controller comprises a processor and a memory, the memory containing instructions that when executed by the processor cause the processor to receive signal quality parameters for a plurality of user equipments served by the base station. The instructions cause the processor to determine an operating parameter of the optical transmitter using the signal quality parameters of the plurality of user equipments. The instructions cause the processor to output the determined operating parameter of the optical transmitter.

The controller may be configured to perform any of the described or claimed methods.

An aspect of the disclosure provides a radio over fibre system comprising a base station comprising a first base station node, a second base station node and an optical communication link connecting the first base station node and the second base station node. The system comprises a controller as described or claimed herein. At least one of the base station nodes comprises an optical transmitter.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the disclosure provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the disclosure will be described, by way of example only, with reference to the accompanying drawings in which.

DETAILED DESCRIPTION

Figure 1:
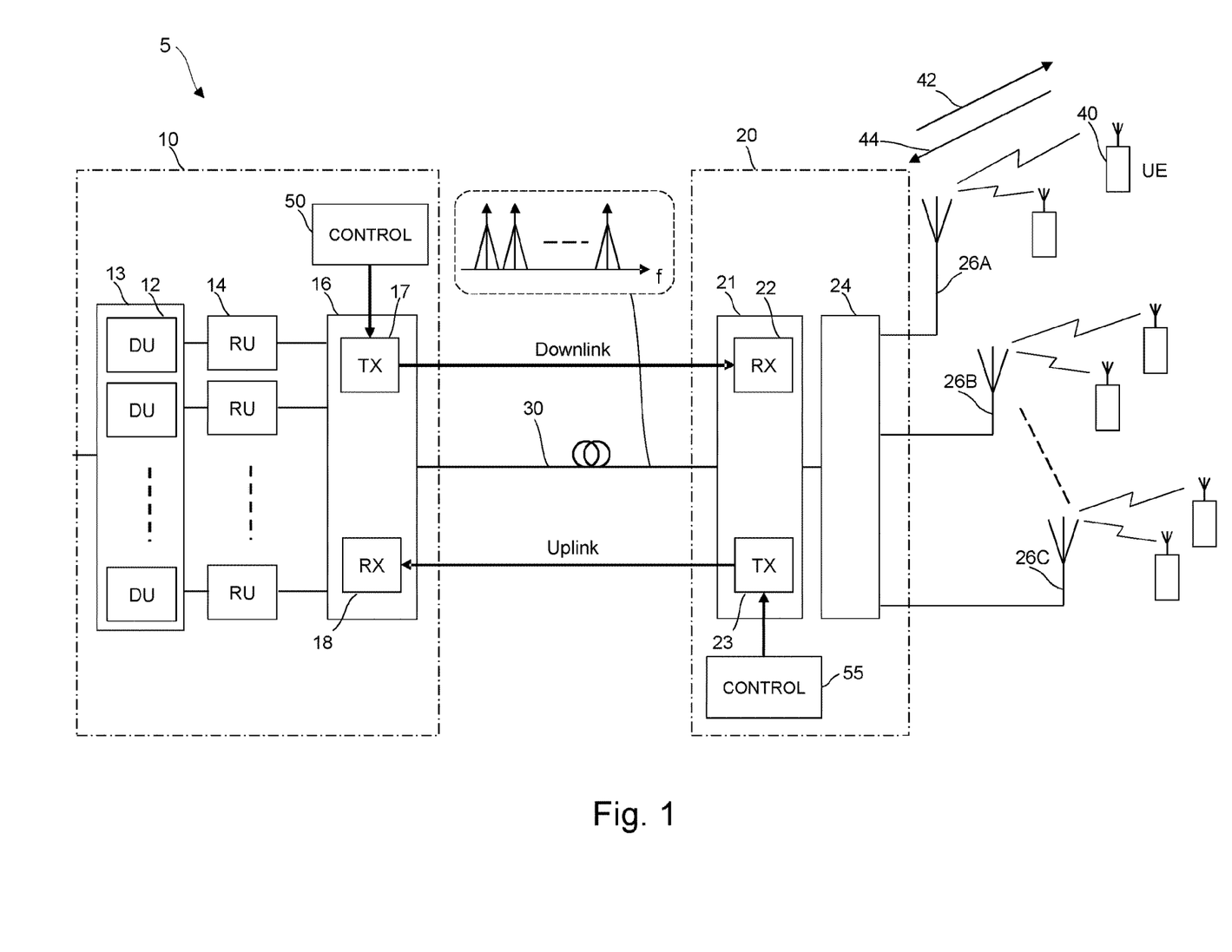
FIG. 1 shows a Radio over Fibre (RoF) system.

FIG. 1 is a schematic overview of a network 5. The network 5 may be considered as a wireless access network, or a part of a wireless access network. The network 5 may be compliant with a number of wireless or radio access technologies, such as one or more of LTE, LTE-Advanced, WCDMA, GSM/EDGE, WiMax, or UMB. The functionality of the base station is split between a first node 10 and a second node 20. The first node 10 and the second node 20 are connected by an optical transmission link 30, such as one or more optical fibres. The first node 10 may be called a central office (CO). The second node 20 may be called a radio head (RH), remote radio head or remote site.

The first node 10 comprises Digital Units (DU) 12 and Radio Units 14. The DU 12 is configured to perform signal processing at baseband. The DU 12 may be called a baseband processing unit. The DU may perform one or more of: coding/decoding; modulation/demodulation; interleaving/de-interleaving; spreading/de-spreading; scrambling/de-scrambling; Fast Fourier Transformation (FFT)/Inverse Fast Fourier Transformation (IFFT). The DUs 12 may optionally be located in a DU pool 13 comprising a plurality of DUs 12. The DU pool 13 may be called a DU cloud or a baseband hotel. A DU 12 or a DU pool 13 can perform baseband processing for one or more RU 14. The pooling of DU resources allows more flexible use of processing resources as demand varies between cells served by the same base station. The RU 14 is configured to perform radio frequency processing of signals received from the DU 12. The RU 14 may perform one or more of: digital-to-analog conversion (DAC)/analog-to-digital conversion (DAC); up-conversion (from baseband to RF or IF)/down-conversion (from RF or IF to baseband); filtering; carrier multiplexing/carrier de-multiplexing. The connection between the DU 12 and RU 14 is digital, such as using the Common Public Radio Interface (CPRI).

The first node 10 comprises an optical transceiver 16. The optical transceiver 16 comprises an optical transmitter 17 for the downlink (downstream direction) and an optical receiver 18 for the uplink (upstream direction). The optical transmitter 17 may comprise an optical source (e.g. a laser) and a modulator. The modulator may directly modulate the optical source, such as by modulating the bias current of the optical source. This is called a Directly Modulated laser (DML). Alternatively, the modulator may modulate an optical signal output from the optical source. That is, the optical signal is modulated downstream of the optical source. The modulator receives an input signal from the RU 14. The optical receiver 18 may comprise an optical detector, such as a photodiode.

The optical receiver 18 receives a modulated optical uplink signal from the optical link 30 and outputs an electrical uplink signal (at RF or an IF). The optical transmitter 17 receives an electrical downlink signal (at RF or an IF) and outputs a modulated optical downlink signal.

The second node 20 comprises an optical transceiver 21. The optical transceiver 21 comprises an optical receiver 22 for the downlink and an optical transmitter 23 for the uplink. The optical receiver 22 and optical transmitter 23 are the same as described for optical transceiver 16. The optical receiver 22 receives a modulated optical downlink signal from the optical link 30 and outputs an electrical downlink signal (at RF or an IF). The optical transmitter 23 receives an electrical uplink signal (at RF or an IF) and outputs a modulated optical uplink signal.

The downlink and uplink signals may share a common optical fibre or may use separate optical fibres. Where a single optical fibre is shared, the downlink and uplink may use different optical wavelengths (lambdas). For example, the downlink may use an optical wavelength $\lambda 1$ and the uplink may use an optical wavelength $\lambda 2$.

The second node 20 can comprise one or more antennas 26A-26C. In some examples, the antennas 26A-26C may be located at the second node 20. In other examples, the antennas 26A-26C may be connected to the second node, for example by cables, such as coaxial cables.

In some examples, signals detected by the receiver 22 may be at the RF frequency required for transmission by an antenna 26A-26C. Minimal processing is required at the second node 20. For example, electrical-domain amplification and/or filtering may be performed by a radio interface 24. Similarly, in the uplink direction, signals received by the antennas 26A-26C may be filtered by radio interface unit 24 before outputting to the optical transmitter 23.

In some examples, signals detected by the receiver 22 may be at a different frequency from that required for transmission by an antenna 26A-26C. A radio interface unit 24 at the second node 20 repositions the signals in the frequency domain to the frequency required for transmission. This may require frequency up-conversion or frequency down-conversion. Other functions of the radio interface unit 24 may comprise amplification and/or filtering. Similarly, in the uplink direction, signals received by the antennas 26A-26C may require repositioning in the frequency domain from the frequency at which they are received to a different frequency (RE or IF) before outputting to the optical transmitter 23. Radio interface unit 24 can perform the frequency repositioning (e.g. by up-conversion or down-conversion). Radio interface unit 24 can also perform filtering of received signals.

FIG. 1 shows a system 5 with multiple antennas 26A-26C. Each downlink (or uplink) signal may be carried on an individual optical wavelength on optical link 30. However, this is wasteful of resources. A set of signals can be multiplexed together and carried by a single optical wavelength carrier. This is called sub-carrier multiplexing (SCM). The sub-carrier multiplexing and sub-carrier de-multiplexing can be performed by the RUs 14 and the radio interface unit 24. Transporting signals on a single fibre, on different carriers or sub-carriers, reduces costs in cabling and for optical ports.

In FIG. 1, each antenna 26A-26C can serve user equipments (UE) 40. A wireless downlink signal 42 and a wireless uplink signal 44 are shown. The signal quality of the wireless downlink signal 42 will vary during the lifetime of a connection between the antenna 26 and UE 40. The signal quality can vary due to factors such as: distance between the antenna 26 and UE 40; transmit power; obstructions etc. The UE measures a signal quality parameter. The signal quality parameter is returned to the base station via the uplink 44. The base station (e.g. DU 12, 13) can use the signal quality parameter to alter a parameter of the wireless downlink transmission, such as changing transmit power, changing a transmit channel or handover to another antenna within the base station, or another base station. Similarly, the signal quality of the wireless uplink signal 44 will vary during the lifetime of a connection between the antenna 26 and UE 40. The signal quality can vary due to factors such as: distance between the antenna 26 and UE 40; transmit power; obstructions etc. The base station (e.g. DU 12, 13) measures a signal quality parameter. The base station can use the signal quality parameter to transmit a message to the UE 40 to alter a parameter of the wireless uplink transmission 44, such as changing transmit power or changing a transmit channel. The base station can use the signal quality parameter to handover to another antenna within the base station, or another base station.

While an individual signal quality parameter is indicative of a connection between a base station and a UE, it has been found that a plurality of signal quality parameters, each obtained for different UEs served by the base station, can provide an indication of the optical signal quality between the first node 10 and the second node 20. For example, if the downlink optical transmitter 17 is operating at a non-optimal state, this can be reflected in the downlink signal quality parameters measured by a plurality of UEs 40 served by the base station. Similarly, if the uplink optical transmitter 23 is operating at a non-optimal state, this can be reflected in the uplink signal quality parameters measured by the base station for signals received from a plurality of UEs 40 served by the base station. In examples described below, the plurality of signal quality parameters are used to control the optical transmitters 17, 23.

The first node comprises a controller 50, and the second node comprises a controller 55, as described below.

Figure 2A:
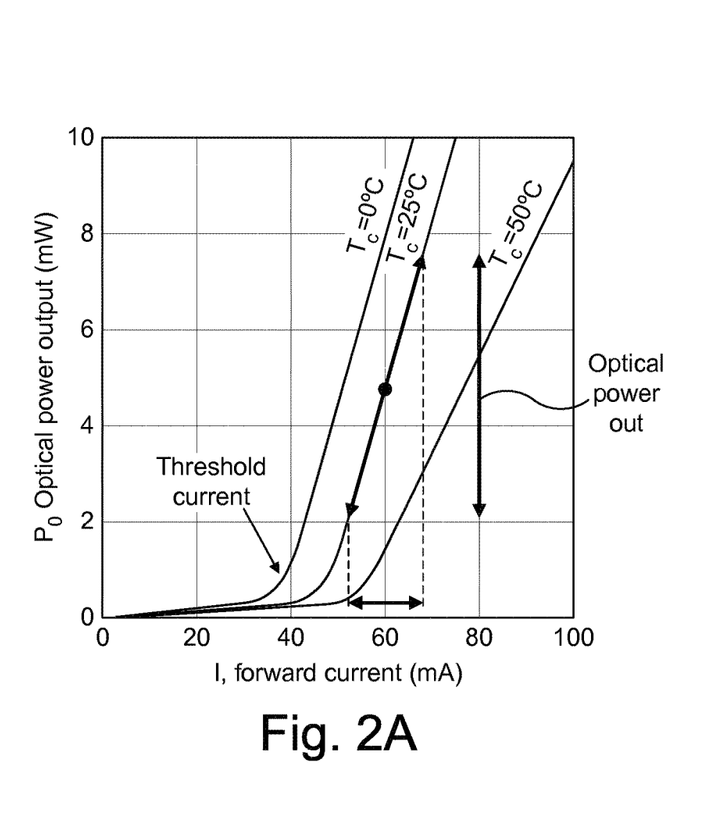
FIGS. 2A and 2B show operating diagrams for an optical transmitter.
Figure 2B:
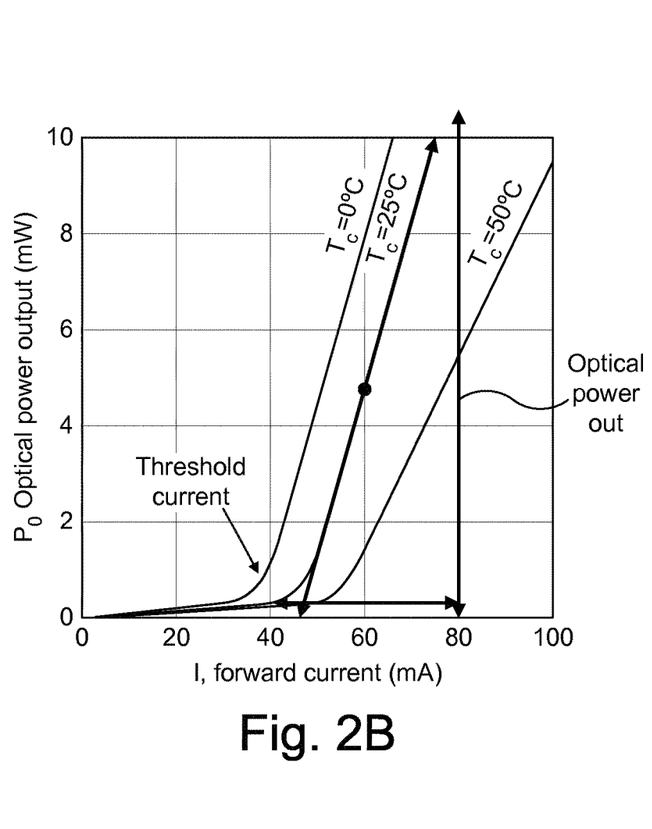

FIGS. 2A and 2B show two example operating diagrams for a Directly Modulated Laser (DML) transmitter for analog transmission. FIG. 2A shows an operating state which provides linear transmission. That is, a change in a modulating signal is linearly translated to a change in a modulated output signal. In this example, the linear transmission state is achieved with a bias current of 60 mA and a RF swing of ±10 mA. The optical output power is a linear mapping of the forward current.

The slope of the forward current-output power relationship has typical values ranging from 0.1 to 0.3 mW/mA. The operating point and RF swing of the transmitter can be chosen to exploit the linear portion of the transmitter relationship in order to keep the signal-to-noise ratio high enough. However the driving current is lower-bounded by the threshold current (below which there is no optical emission) and upper-bounded by the maximum working value tolerable by the device.

FIG. 2B shows an example of an operating state with non-linear transmission. The bias current has the same value of 60 mA. The modulation depth is doubled to ±20 mA. While higher output power can be launched into the optical fibre, strong signal compression occurs for low forward currents, because the laser operates in the non-linear region of the forward current-output power relationship. This is undesirable.

The relationship shown in FIGS. 2A and 2B is dependent on the physical sample, and on factors such as temperature. Typically, a system is designed considering worst-case parameters of its components. To complicate the situation, in multi-channel transmission the RF swing is adjusted with a change in the number of active channels.

Figure 3:
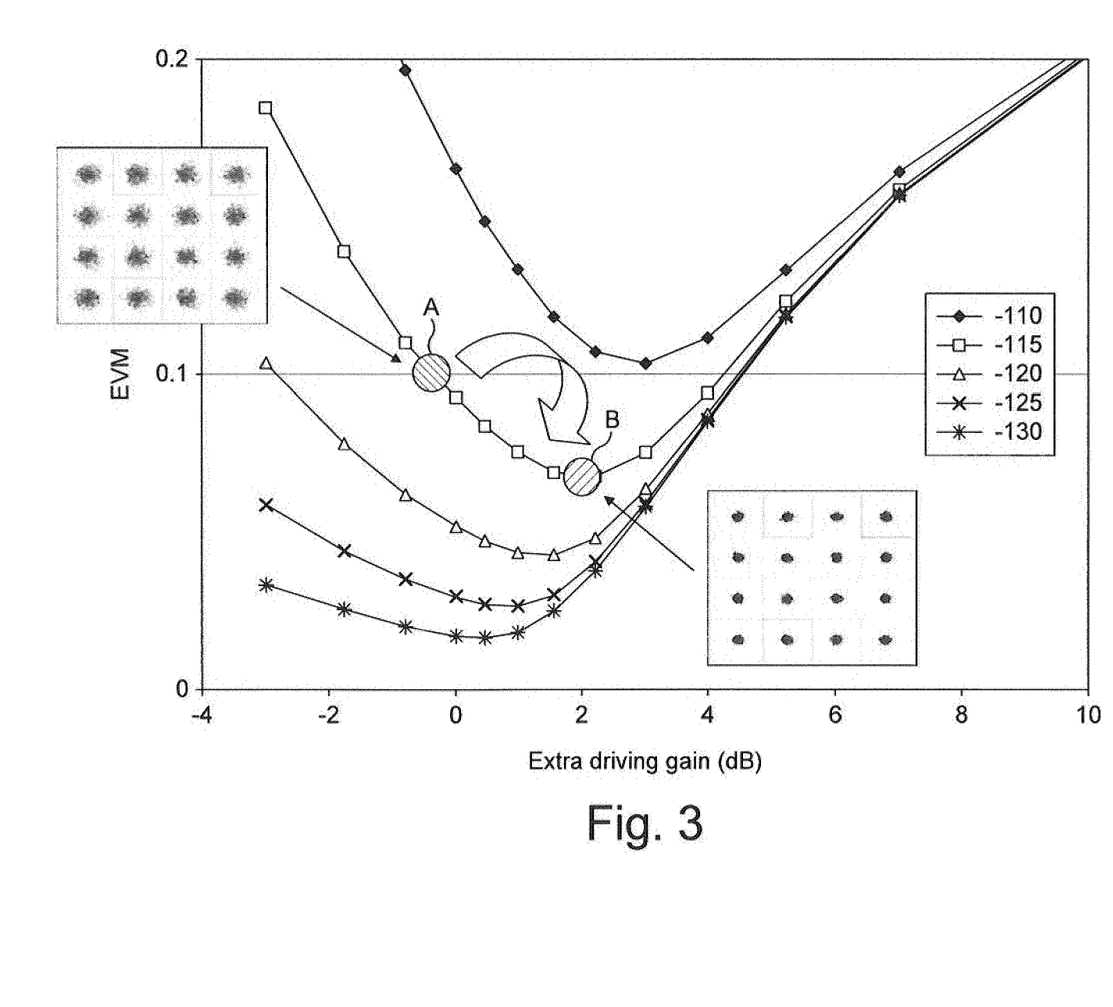
FIG. 3 shows an operating diagram for an optical transmitter.

FIG. 3 shows quantitatively how the choice of an operating parameter, e.g. a modulation parameter, for example, the modulation depth (RF swing) impacts the system performance, in this case measured in terms of Error Vector Magnitude (EVM). EVM is a measure of deviation of a constellation point (in the IQ plane) from an ideal position. Another term for EVM is Receive Constellation Error (RCE). The horizontal axis of FIG. 3 represents driving gain. This is a gain applied to a signal which is used to modulate an optical transmitter, and represents modulation depth of the signal at the optical transmitter. For small values of modulation depth (shown on the left-hand side of FIG. 3) the performance is limited by the noise sources in the optical link. Noise sources include the Relative Intensity Noise (RIN) of a laser and receiver thermal noise. In this example, receiver thermal noise is negligible with respect to the RIN. For high values of modulation depth (shown on the right-hand side of FIG. 3) the signal performance is limited by the non-linear distortion induced by operating the laser in a region where the current-power relationship is not linear. FIG. 3 was obtained for a 1024-carrier OFDM signal, with each carrier modulated by 16QAM carrying an aggregate of 100 Mbit/s which is representative of a LTE signal. The EVM has been plotted versus an extra gain (dB) applied to the RF swing signal. The plot is made for different values of RIN which is the dominant noise source. All plots converge when the performance is dominated by non-linearities.

In FIG. 3, operating point A represents an operating point in which a linear regime is guaranteed by design and the extra driving gain is zero. In this case, the performance is limited by the RIN. In this RIN-limited region the EVM ranges from 1.7% to 5% to 10% as the RIN increases from −130 to −120 to −115 dB/Hz$^{0.5}$, respectively. In a real system the laser RIN is not exactly known but only bounded by the component optical specification. For a given RIN, it is possible to minimise the EVM by intentionally applying an additional driving gain, appropriately calculated from data obtained from the receiver. For example, when the laser RIN is −115 dB/Hz$^{0.5}$, the corresponding EVM can drop from 0.1 to 0.06 by only applying 2.2 dB extra driving gain. Operating point B represents a more optimal operating point. FIG. 3 shows the constellation diagrams corresponding to the operating points A and B. At operating point B, it is possible to achieve the best trade-off condition between transmitter linearity and tolerance to noise. The EVM diagram for point B shows reduced noise.

Due to the various factors involved, it is only possible to make a change to a more optimum working point by using measurements acquired during actual operation of the optical system. However, it is desired to minimise the amount of equipment deployed, especially at the second node 20. As described above, it has been found that a plurality of signal quality parameters, each obtained for a different UE served by the base station, can provide an indication of the optical signal quality between the first node 10 and the second node 20. This provides an advantage of acquiring information which can improve the operating state of the optical transmitter without the need to directly measure parameters of the optical transmission system.

Figure 4:
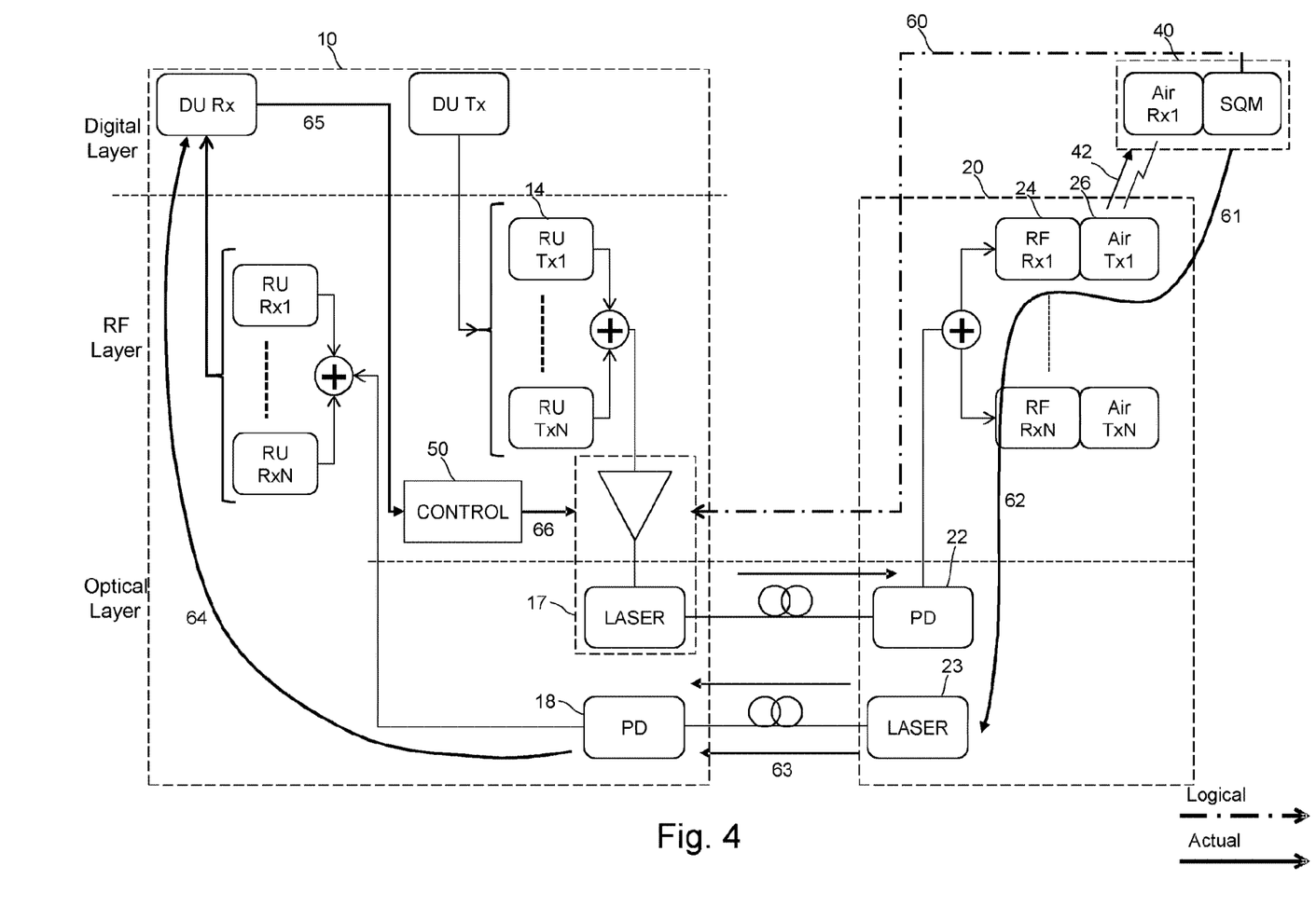
FIG. 4 shows control of a downlink optical transmitter.

FIG. 4 shows the first and second nodes 10,20, and an example UE 40, arranged according to functions on a digital layer, RF layer and optical layer. The system is arranged to control the downlink optical transmitter 17. Control of the downlink optical transmitter 17 uses signal quality parameters measured by UEs 40. A suitable signal quality parameter is Channel Quality Indicator (CQI). CQI is present in most of the current radio access technologies, e.g. HSPA, LTE. The downlink signal is generated by the DU and RU at the first node 10 and transmitted (in the analog domain at RF or an IF) by optical transmitter 17 to the second node. The second node 20 recovers an electrical signal, performs any frequency repositioning (if required) and transmits a wireless downlink signal 42 from antenna 26. The wireless downlink signal 42 is received by UE 40. UE 40 performs signal quality measurements (SQM). One suitable signal quality parameter is CQI. CQI is a parameter which is indicative of the end-to-end channel quality. The end-to-end channel quality includes impairments contributed by the wireless downlink 42 as well as other equipment in the downlink path, including the optical transmitter 17. CQI is measured by a plurality of different UEs 40 served by the base station. Where the base station has a plurality of antennas 26, CQI is measured by UEs 40 served by the different antennas 26.

In some examples, the CQI may indicate the highest modulation and the code rate at which the block error rate (BLER) of the channel being analysed does not exceed 10%. CQI, in the case of LTE, takes discrete values between 0 and 15: Index 0 indicates that the UE channel is inoperable. An example table of CQI indexes is shown in 3GPP 36.521-1 V9.3.0 test specification, "User equipment (UE) conformance specification, radio transmission and reception, part 1: conformance testing", table A. 4-3, p. 382.

FIG. 4 shows a logical path 60 by which CQI measured by the UEs is used to control the optical transmitter 17 at the first node 10. FIG. 4 also shows an example of an actual path 61-66 by which CQI measured by the UEs is used to control the optical transmitter 17 at the first node 10. The CQI value is reported by the UEs 40 by sending a message on the uplink (path 61). This is returned to the optical transmitter 23 at the second node 20 (path 62), the optical link 30 (path 63), optical receiver 18 at the first node 10, the RU and the DU (path 64). The DU outputs the CQI values to a controller 50. The controller 50 uses a plurality of CQI values to determine a value of an operating parameter of the optical transmitter 17. The controller 50 can determine a value for the modulation depth of the optical transmitter 17. One way of modulating an optical transmitter is to modulate the bias current of an optical source (e.g. laser). As shown in FIGS. 2A and 2B, a variation in bias current is translated into an output signal by the current-output power relationship. The modulation depth can be varied by varying a gain of an electrical amplifier which supplies the bias current to the optical source of the optical transmitter. This technique is applicable to a Directly Modulated Laser (DML). Another way of modulating an optical transmitter is to modulate an optical signal which has been generated by an optical source (e.g. laser). The optical signal is modulated downstream of the optical source. The modulation depth can be varied by varying a gain of an electrical amplifier which applies a modulating signal to the modulator.

The controller 50 can use an iterative technique to find an optimum operating point for the optical transmitter 17. The optimum operating point can be point B shown in FIG. 3, representing a point which offers lowest EVM for the laser RIN.

Figure 5:
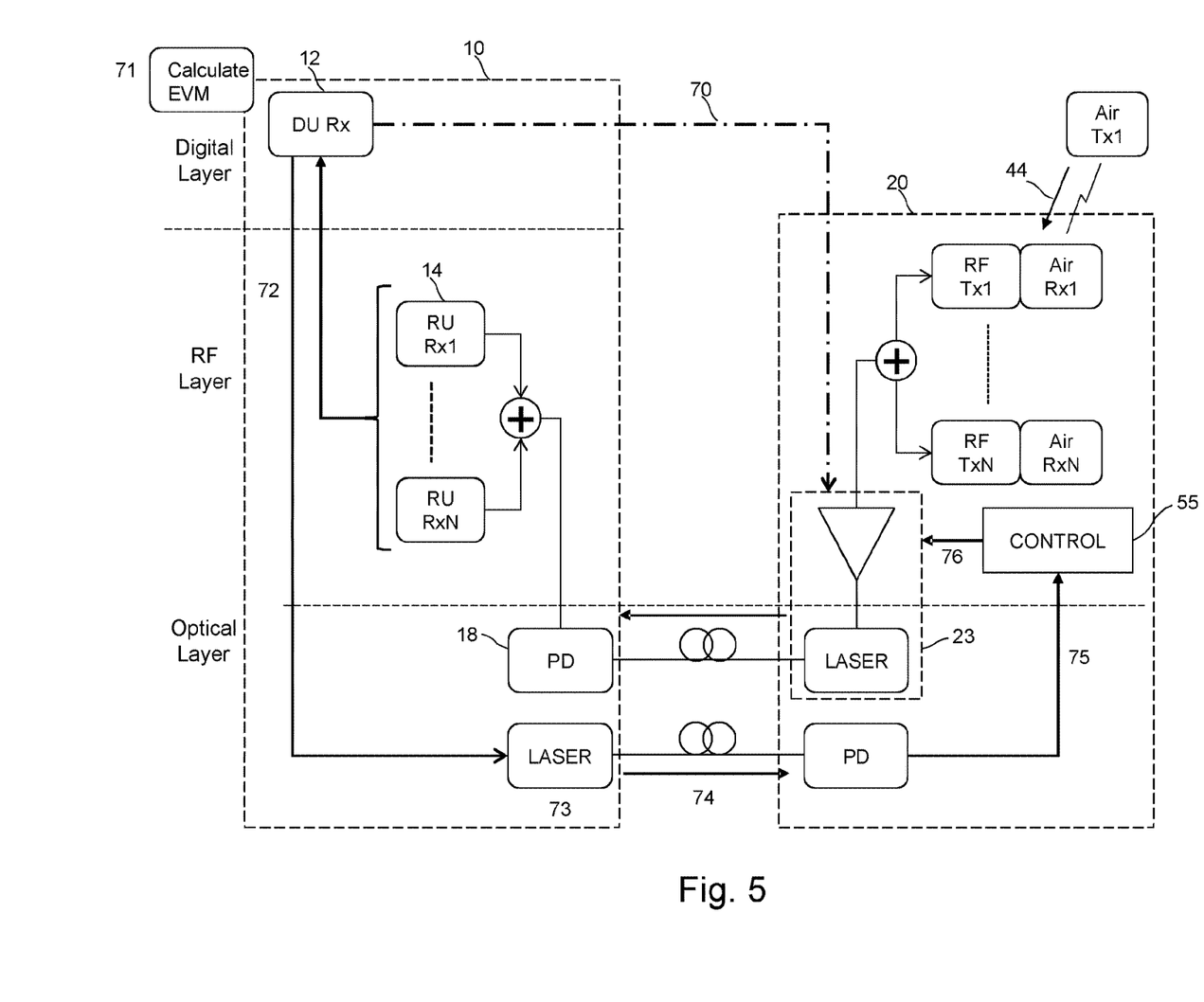
FIG. 5 shows control of an uplink optical transmitter.

FIG. 5 shows the first and second nodes 10,20, and an example UE 40, arranged according to functions on a digital layer, RF layer and optical layer. The system is arranged to control the uplink optical transmitter 23. Control of the uplink optical transmitter 23 is based on, i.e. uses, signal quality parameters measured by the DUs 12. The uplink signal is generated by the UE 40 and transmitted as a wireless uplink 44 to an antenna 26. Frequency re-positioning may be performed at the second node 20 before modulating an optical transmitter 23 with the signal. An optical receiver at the first node 10 recovers an electrical signal. The signal is processed by the RU 14 and the DU 12. The DU 12 measures a signal quality parameter which is indicative of signal quality of a signal received from a UE. The DU 12 measures signal quality parameters for a plurality of UEs served by the base station. One suitable signal quality parameter measured by the DU 12 is EVM. EVM is a parameter which is indicative of the end-to-end channel quality. Another signal quality parameter could be measured, such as Bit Error Rate (BER), a parameter indicative of a number (or ratio or percentage) of errored frames. Another possible signal quality parameter is block error ratio (BLER) obtained by counting the ACK/NACKs (ACKnowledged/Not ACKnowledged) returned by the UE. While EVM is described in the following description, it will be understood that another signal quality parameter could be used instead of EVM. The end-to-end channel quality includes impairments contributed by the wireless uplink 44 as well as other equipment in the uplink path, including the optical transmitter 23. EVM is measured for signals received from a plurality of different UEs 40 served by the base station. Where the base station has a plurality of antennas 26, EVM is measured for signals received from UEs 40 served by the different antennas 26.

FIG. 5 shows a logical path 70 by which EVM measured by the DUs 12 is used to control the optical transmitter 23 at the second node 20. In some examples, the optical transmitter 23 is configured to transmit analogue representations of radio signals, carried on an optical signal. The optical transmission is within the base station, i.e. between an antenna node and a radio unit node. FIG. 5 also shows an example of an actual path 71-76 by which EVM measured by the DUs is used to control the optical transmitter 23 at the second node 20. After calculating the EVM values 71, the values can be transmitted to the second node 20 via the RU 14 of the RF layer and the downlink optical transmitter of the optical layer (73, 74). The values are received at the second node 20 and forwarded (75) to a controller 55 at the second node 20. Controller 55 uses a plurality of received EVM values to determine a value of an operating parameter of the optical transmitter 23. The controller 55 can determine a value for the modulation depth of the optical transmitter 17. The techniques for controlling the modulation depth are the same as described above for optical transmitter 17. The system may forward a set of EVM values from the first node 10 to the second node 20, and may determine a value of an operating parameter of the optical transmitter 23 at the second node 20. Alternatively, the system may calculate the operating parameter of the optical transmitter 23 at a controller located at the first node 10, and only send the new value of the operating parameter to the second node via path 71-75. This reduces the amount of transmitted data. The EVM values, or operating parameter value, can be transmitted to the second node 20 in various ways. A dedicated pilot tone could be used. In a case where sub-carrier multiplexing is used, a dedicated subcarrier can carry the information.

Figure 6:
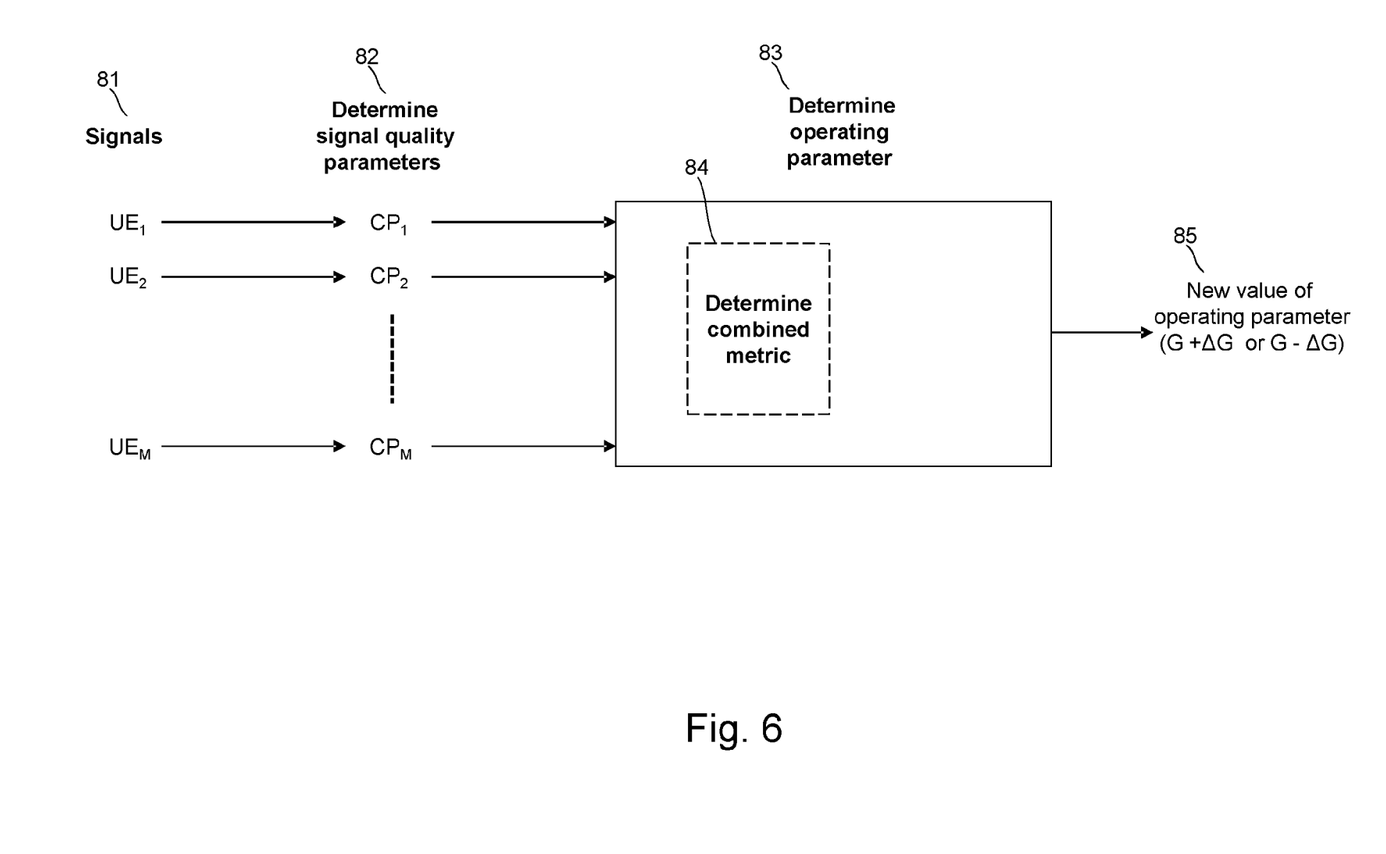
FIG. 6 shows an overview of an example of the control method.

As described above, optical impairments affect the end-to-end channel quality measured by the UEs (downlink) or by DUs (uplink). FIG. 6 shows an overview of an example method for determining an operating parameter of an optical transmitter. The example shown in FIG. 6 relates to measurements made by UEs on the downlink. A similar method can be applied to measurements made by DUs on the uplink. The example shown in FIG. 6 may be performed continuously (e.g. repeated after a short delay), periodically (e.g. once per hour, once per day, once per month, or some other time interval), or it can be triggered by an event, such as a change in the number of optical channels or sub-carriers. The method uses signal quality parameters for signals to UEs (downlink) or from UEs (uplink) which passed via a particular optical transmitter. For example, in FIG. 1 all UEs 40 at antennas 26A-26C are served by the same optical transmitter 17 on the downlink, and by the same optical transmitter 23 on the uplink. Thus, the signal quality parameters has a value due to, or based on, both the optical transmitter and the wireless connection between the antenna of the base station and the UE. As such, signal quality parameters may be considered as including a component due to the optical transmitter (i.e. within the base station) and a component due to the wireless (radio) channel (i.e. between the base station and UE).

At block 81, UEs 40 receive wireless signals on the downlink. At block 82, UEs determine signal quality parameters. Each UE determines a signal quality parameter $CP_i$. A first UE determines a signal quality parameter $CP_1$, a second UE determines a signal quality parameter $CP_2$, and so on. A total of M signal quality parameters are determined. At block 83, an operating parameter of an optical transmitter is determined using the signal quality parameters determined at block 82. As part of block 83, the method may determine a combined metric 84 which combines the set of M signal quality parameters. The following equation shows an example of a possible combined metric function (quadratic denominator) calculated at the $n^{th}$ step:

$$F^u(n) = \frac{1}{M}\sum_{i=1}^{M} \frac{CP_i(n)}{a[CP_i(n) - CP_i(n-1)]^2 + 1}$$

where:
M is the number of UEs served by the base station using the same optical link;
$CP_i$ is a channel quality parameter measured by a single UE (or DU);
a is a constant value chosen in order to achieve the best trade-off between the method convergence speed and the accuracy in achieving the optimal working point.

A feature of this combined metric function is that it uses CP values [CP(n)] from the current iteration (n) of the method, as well as CP values [CP(n−1)] from the previous iteration (n−1) of the method. A fast-changing CP is indicative of a change in radio conditions, rather than a change in the optical transmitter. A fast-changing CP can be due to a UE located at the edge of a radio cell, or a UE which is experiencing impairments due to a poor radio channel quality. It is desirable that UEs reporting fast-changing CP values have a reduced contribution to the overall combined metric F(n) as they are less likely to represent a state of the optical transmitter. In the example equation above, the current CP value [CP(n)] is divided by a difference quantity $[CP(n)-CP(n-1)]^2$. This difference quantity on the denominator of the equation reduces the contribution of a CP value which has changed significantly between the two iterations of the method. The determining of an operating parameter of the optical transmitter uses a change in value of signal quality parameters for a same user equipment. In this example, signal quality parameters are inversely weighted based on their change in value. For the user equipment $UE_i$, the higher the difference in absolute value between the CP at the step n and the CP at the step n−1, the lower the contribution of the user equipment $UE_i$ to the calculation of the metric at step n. The UEs with fast-changing CP values have a smaller contribution to the combined metric value F(n) as they are weighted by the large denominator value. The UEs with slow-changing CP values have a larger contribution to the combined metric value F(n) as they are weighted by a much smaller denominator value. Thus, the combined metric value F(n) is configured to process the received CP values. In some examples, the processing provides a filtering out (i.e. reduction) in variations in channel quality due to the wireless part of the channel, in order to determine variations in channel quality due to the optical transmitter.

Consider an example where a first UE, $UE_1$, reports the signal quality parameter values: CP(n−1)=10; CP(n)=5 and where a second UE, $UE_2$, reports the signal quality parameter values: CP(n−1)=10; CP(n)=9. The first UE has reported fast-changing CP values, with the second measurement 50% of the first measurement. This is indicative of radio conditions, rather than optical transmitter conditions. The second UE has reported slower-changing CP values. Substituting the values into the above equation for the combined metric, the contribution to the combined metric from $UE_1$ is a value of 5/26 and the contribution to the combined metric from $UE_2$ is a value of 9/2. It can be seen that $UE_1$ with the fast-changing CP values has been inversely weighted based on the change in CP value.

The signal quality parameters include a component due to the optical transmitter and a component due to the wireless radio channel. Thus, the method comprises a function based on relatively slow variations of channel quality parameters. This function may be considered as an indication of performance of the optical transmitter. Changes in channel quality (impairments) due to the radio channels of each link (DU-UE and UE-DU) are filtered out. This indication or function provides for determination of a parameter relating to the optical transmission (i.e. modulation) of the radio signal (i.e. radio over fiber), rather than due to the wireless radio channel. The operating parameter of the optical transmitter may then be derived from the parameter (function) indicating the performance of the optical transmitter.

It will be appreciated that the above equation is only one possible implementation for calculating the combined metric. Other equations can be used.

The combined metric may be calculated using more than two previous CP values. Other ways of weighting the values reported by UEs can be used. An alternative way of calculating the combined metric is to discard CP values which have changed by more than a threshold amount, or by more than a threshold percentage or ratio, so that UEs with fast-changing CP values do not contribute to the combined metric.

Block 83 determines a new value of an operating parameter for the optical transmitter. The new value of the operating parameter (gain, G) can increase from a previous value by an incremental amount (i.e. G+ΔG) or decrease from a previous value by an incremental amount (i.e. (i.e. G−ΔG). An advantage of making incremental changes is to minimise any sudden changes to the system. It also allows the method to test whether the incremental change had a good or bad effect on the combined metric. By repeatedly performing this method in small increments, the method can find an optimum value of the operating parameter.

Figure 7:
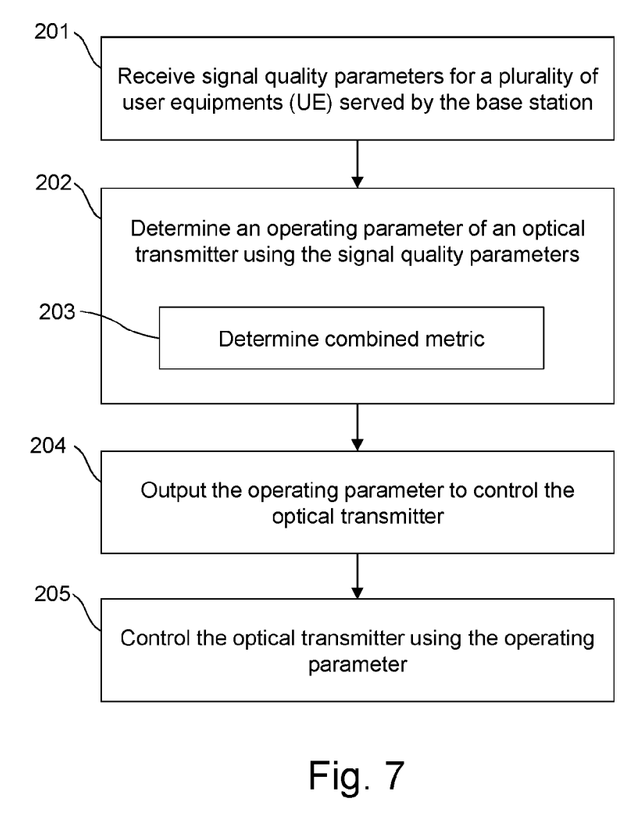
FIG. 7 shows a method of determining an operating parameter of an optical transmitter.

FIG. 7 shows a method of determining an operating parameter of an optical transmitter as a flow chart. The method receives, at block 201, signal quality parameters for a plurality of user equipments (UE) served by the base station. In the downlink, the signal quality parameters are calculated by the UEs themselves. In the uplink, the signal quality parameters are calculated by the DUs for connected UEs. A controller receives the signal quality parameters. Example delivery paths for these signal quality parameters have been described in FIGS. 4 and 5. At block 202 the method determines an operating parameter of the optical transmitter using the determined signal quality parameters of the plurality of user equipments (UE). At block 204 the method outputs the operating parameter to control the optical transmitter. Block 202 may comprise determining, at block 203, a combined metric using a plurality of signal quality parameters. Block 205 controls the optical transmitter (e.g. the modulation parameter) using the determined operating parameter. If the controller and the optical transmitter being controlled are located at the same node of the RoF system, (e.g. controller 50 and transmitter 17 at node 10, or controller 55 and transmitter 23 at node 20) then block 205 can be performed by the same controller which performs blocks 201-204. If the controller and the optical transmitter being controlled are located at different nodes of the RoF system, (e.g. controller 50 at node 10 and transmitter 23 at node 20) then the control of the optical transmitter at block 205 may be performed by a first controller at one of the nodes and blocks 201-204 may be performed by a second controller at the other one of the nodes.

Figure 8:
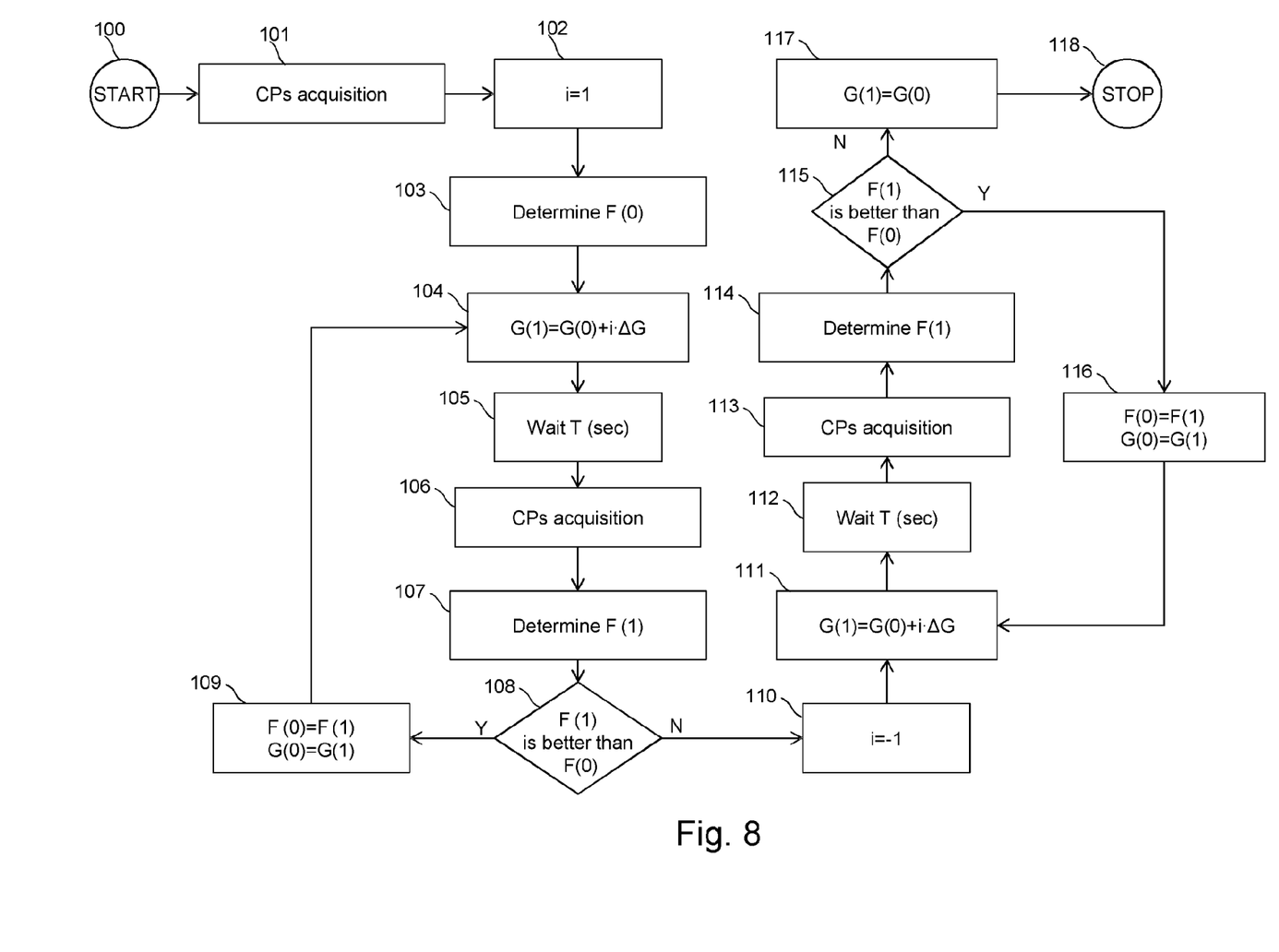
FIG. 8 shows a more detailed example of implementing the method.

FIG. 8 shows a more detailed example of a method which iteratively changes the operating parameter, e.g. modulation parameter, (gain G) of the optical transmitter by an incremental amount and determines if the change has a good or bad effect on the value of the combined metric F(n). G is the gain. ΔG is the increment in the value of the gain. The method begins at block 100. The initial value of the gain is G(0). At block 101 the method acquires CPs reported by UEs. At block 102 the method sets i=1. This sets the direction of the incremental change. The combined metric F(0) is calculated at block 103. Block 104 increments the gain by ΔG. After waiting T seconds at block 105, a new set of CPs are acquired at block 106. A new value of the combined metric is calculated at block 107. If the value of the combined metric F(1) calculated at block 107 is better than the starting value F(0), this shows the incremental change at block 104 had a good effect. That is, the operating state of the optical transmitter has improved. Block 109 accepts the values of gain G and combined metric F. The method returns to block 104 and tries another incremental change in the same direction.

Returning to block 108, if the value of the combined metric F(1) calculated at block 107 is worse than the starting value F(0), this shows the incremental change at block 104 had a bad effect. That is, the operating state of the optical transmitter has worsened. The method proceeds to block 110 and sets i=−1. This reverses the direction of the incremental change and sets the gain G to a value of −ΔG from the starting value G(0). After waiting T seconds at block 112, the method acquires a new set of CPs at block 113 and determines the combined metric F(1) at block 115. If the value of the combined metric F(1) calculated at block 115 is better than the starting value F(0), this shows the incremental change at block 111 had a good effect. That is, the operating state of the optical transmitter has improved. Block 117 accepts the values of gain G and stops.

Returning to block 115, if the value of the combined metric F(1) calculated at block 115 is worse than the starting value F(0), this shows the incremental change at block 111 had a bad effect. Block 116 and block 111 set the gain G back to the original value at the start of the method.

The combination—or aggregation—of signal quality parameter values in determining the operating parameter, or the combined metric, has an effect of averaging, or filtering out, significant changes in measurements from individual UEs. Changes in CQI or EVM are likely to be contributed by changes in the wireless part of the end-to-end channel between the DU and the UE. Such changes in the wireless part (wireless channel) of the end-to-end channel between the DU and the UE are substantially filtered out by the processing of the described method.

The methods shown in FIGS. 6 to 8 are individually applied to the uplink and the downlink. The downlink transmitter 17 is controlled based on values of CQI reported by UEs. The combined metric is maximised, because the combined metric represents channel quality. The uplink transmitter 23 is controlled based on values of EVM reported by DUs. The combined metric is minimised, because the combined metric represents an error quantity.

The method described above makes incremental changes in a value of an operating parameter of an optical transmitter and finds an optimum value. An alternative method uses the signal quality parameters to directly calculate a value of an operating parameter of an optical transmitter. While this is possible, it requires knowledge of various transmitter parameters which can vary from one transmitter to another. The method which makes incremental changes can find an optimum value of the operating parameter of an optical transmitter without knowledge of all transmitter parameters.

Figure 9:
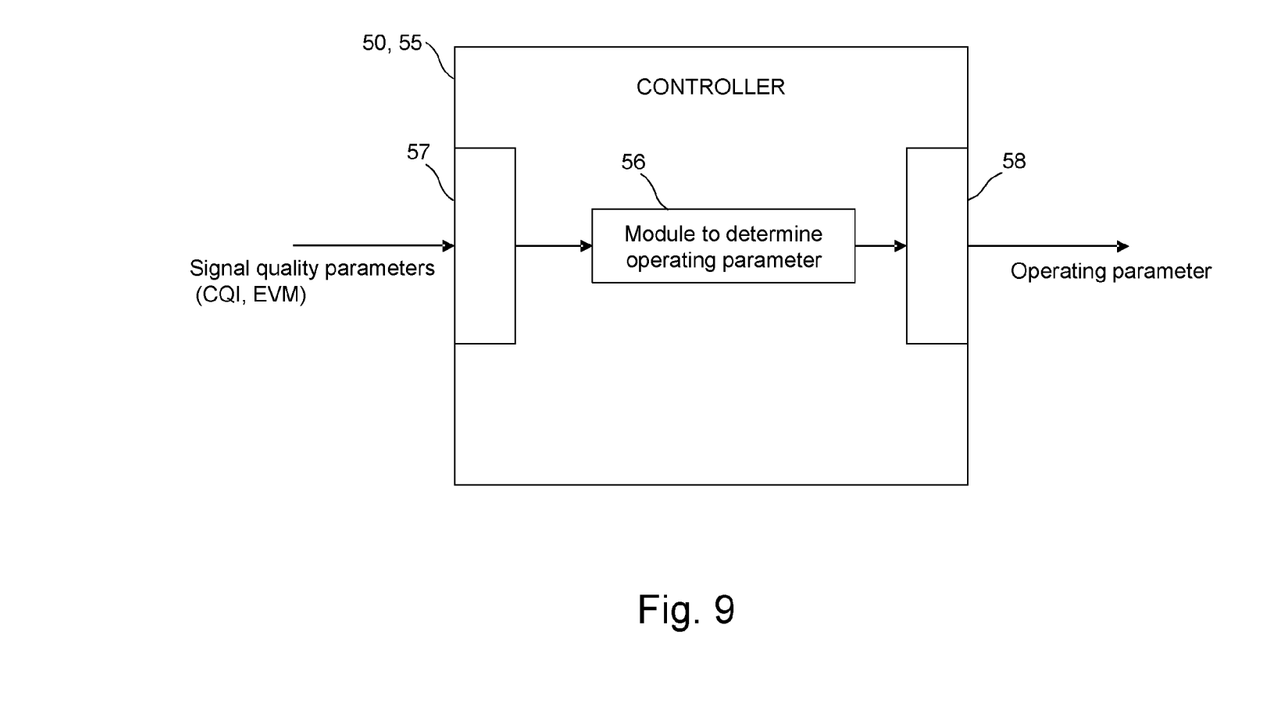
FIG. 9 shows a controller for use in the system.

FIG. 9 shows an example of a controller 50 and/or 55. The controller comprises an input 57 configured to receive a signal quality parameter of a plurality of user equipments (UE) served by the base station. For example, the input 57 of the controller 50 and/or 55 can receive CQIs or EVMs from a DU 12 of the base station. A computation module 56 is configured to determine an operating parameter of an optical transmitter using the determined signal quality parameters of the plurality of user equipments (UE). An output 58 is configured to output the determined operating parameter of the optical transmitter. Output 58 may connect to the optical transmitter 17, 23.

Figure 10:
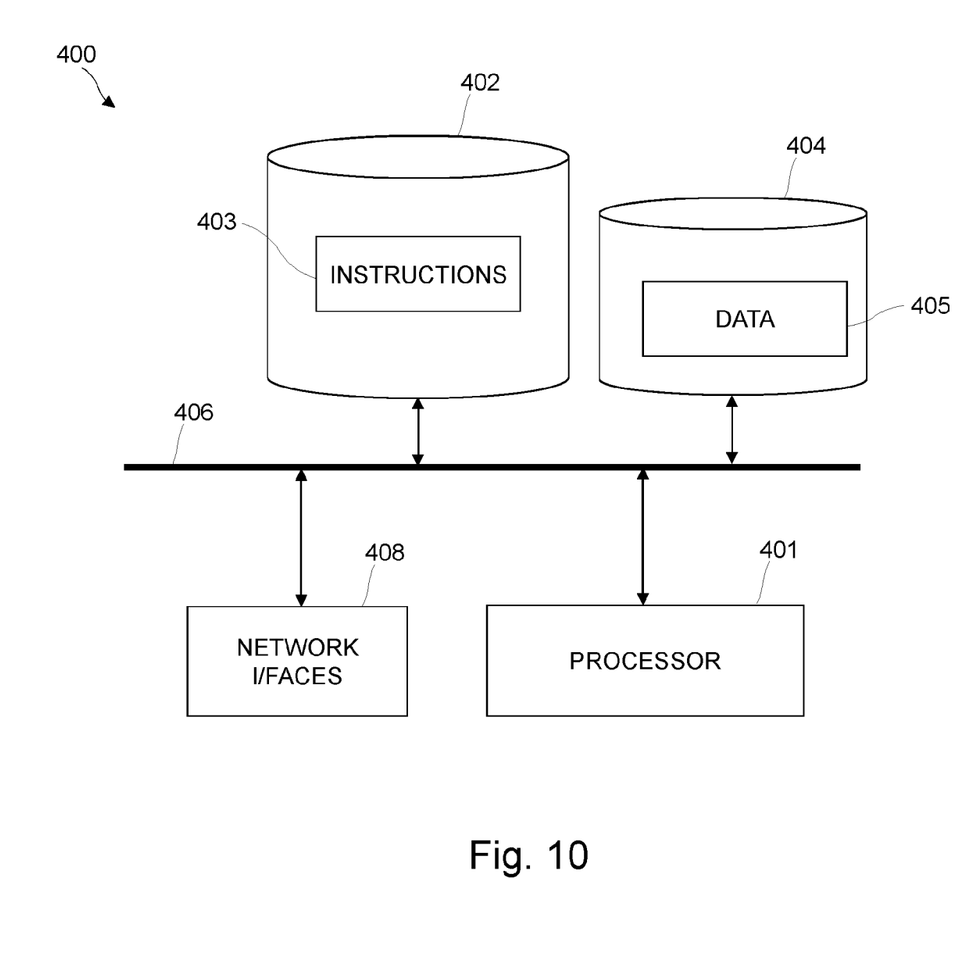
FIG. 10 shows apparatus for a computer-based implementation.

FIG. 10 shows an example of processing apparatus 400 which may be implemented as any form of a computing and/or electronic device, and in which embodiments of the system and methods described above may be implemented. Processing apparatus may implement all, or part of, the method shown in any of FIGS. 6 to 8, or described or shown in earlier Figures. Processing apparatus 400 comprises one or more processors 401 which may be microprocessors, controllers or any other suitable type of processors for executing instructions to control the operation of the device. The processor 401 is connected to other components of the device via one or more buses 406. Processor-executable instructions 403 may be provided using any computer-readable media, such as memory 402. The processor-executable instructions 303 can comprise instructions for implementing the functionality of the described methods. The memory 402 is of any suitable type such as read-only memory (ROM), random access memory (RAM), a storage device of any type such as a magnetic or optical storage device. Additional memory 404 can be provided to store data 405 used by the processor 401. The processing apparatus 400 comprises one or more network interfaces 408 for interfacing with other network entities.

An advantage of at least one example is identification and setting of the best working condition for a RoF transmitter only by measuring UE channel quality indicators already available in the radio layer (e.g. CQI in HSPA and LTE).

An advantage of at least one example is that no additional hardware is required compared with existing RoF systems. The information used in the feedback mechanism is derived from already available channel quality indicators.

An advantage of at least one example is that the method can be applied to future radio access technologies as it works with any channel quality monitoring parameter (CP).

An advantage of at least one example is relaxing of laser requirements (e.g. Relative Intensity Noise (RIN)) by finding the best working condition of each optical transmitter.

An advantage of at least one example is that the method is compatible with a multi-channel system (e.g. SCM) as the extra driving range is adaptively reduced as the number of channels increases.

Modifications and other embodiments of the disclosure will come to mind to one skilled in the art having the benefit of the teachings presented in the foregoing descriptions and the associated drawings. Therefore, it is to be understood that the disclosure is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of determining an operating parameter of an optical transmitter in a radio over fiber system, the system comprising a base station comprising a first base station node and a second base station node connected by an optical communication link, wherein at least one of the base station nodes comprises an optical transmitter, the method comprising:

receiving signal quality parameters for a plurality of user equipments served by the base station; and determining an operating parameter of the optical transmitter using the received signal quality parameters of the plurality of user equipments, wherein the determining of an operating parameter of the optical transmitter uses a change in value of signal quality parameters for a same user equipment, and signal quality parameters are inversely weighted based on their change in value, wherein the operating parameter of the optical transmitter is a modulation parameter comprising modulation depth of the optical transmitter, wherein a signal quality parameter of the received signal quality parameters is based on the optical transmitter and on a wireless channel between a user equipment of the plurality of user equipments and the base station, and wherein the signal quality parameter is indicative of an end-to-end channel quality.

2. The method of claim 1, wherein the method is performed iteratively at spaced-apart times and, at each iteration, the determining an operating parameter of the optical transmitter comprises determining whether to increase or decrease a value of the operating parameter.

3. The method of claim 1, wherein the determining the operating parameter of the optical transmitter comprises processing of the signal quality parameters of the plurality of user equipments to determine the operating parameter of the optical transmitter.

4. The method of claim 1, wherein the second base station node comprises, or is connected to, a plurality of antennas, and the receiving of signal quality parameters for a plurality of user equipments served by the base station comprises receiving signal quality parameters for user equipments served by the plurality of antennas.

5. The method of claim 1, wherein the optical transmitter is located at the first base station node, and the signal quality parameters are indicative of a quality of a downlink wireless signal received at the user equipments from the base station.

6. The method of claim 5, wherein the signal quality parameter is received in a communication from a user equipment.

7. The method of claim 5, wherein the signal quality parameter is Channel Quality Indication (CQI).

8. The method of claim 1, wherein the optical transmitter is located at the second base station node and the signal quality parameter is indicative of quality of an uplink wireless signal from the user equipment to the base station.

9. The method of claim 8, wherein the signal quality parameter is determined at the first base station node.

10. The method of claim 8, wherein the signal quality parameter is Error Vector Magnitude (EVM).

11. The method of claim 1, further comprising:
controlling the optical transmitter using the determined operating parameter.

12. A processing circuit configured to determine an operating parameter of an optical transmitter in a radio over fiber system, the system comprising a base station comprising a first base station node and a second base station node connected by an optical communication link, wherein at least one the base station nodes comprises an optical transmitter, the processing circuit comprising:
an input circuit configured to receive signal quality parameters for a plurality of user equipments served by the base station;
one or more processors configured to determine an operating parameter of the optical transmitter using the received signal quality parameters of the plurality of user equipments,
wherein the determining of an operating parameter of the optical transmitter uses a change in value of signal quality parameters for a same user equipment, and signal quality parameters are inversely weighted based on their change in value; and
an output circuit configured to output the determined operating parameter of the optical transmitter, wherein the operating parameter of the optical transmitter is a modulation parameter comprising modulation depth of the optical transmitter, wherein a signal quality parameter of the received signal quality parameters is based on the optical transmitter, and on a wireless channel between a user equipment of the plurality of user equipments and the base station, and wherein the signal quality parameter is indicative of an end-to-end channel quality.

13. The processing circuit of claim 12, wherein the one or more processors are configured to perform the determining iteratively, at spaced apart times, and at each iteration, to determine whether to increase or decrease a value of the operating parameter.

14. The processing circuit of claim 12, wherein the processing circuit comprises a processor and a memory, the memory containing instructions that when executed by the processor cause the processor to:
receive signal quality parameters for a plurality of user equipments served by the base station;
determine an operating parameter of the optical transmitter using the signal quality parameters of the plurality of user equipments; and
output the determined operating parameter of the optical transmitter.

15. A radio over fiber system comprising:
a base station comprising:
a first base station node; and
a second base station node;
an optical communication link connecting the first base station node and the second base station node; and
the processing circuit of claim 12;
wherein at least one of the base station nodes comprises an optical transmitter.

16. A non-transitory computer-readable medium comprising, stored thereupon, a computer program product comprising a machine-readable medium carrying instructions that, when executed by a processor in a controller of an optical transmitter in a radio over fiber system, the system comprising a base station comprising a first base station node and a second base station node connected by an optical communication link, wherein at least one of the base station nodes comprises an optical transmitter, cause the processor to:
receive signal quality parameters for a plurality of user equipments served by the base station; and determine an operating parameter of the optical transmitter using the received signal quality parameters of the plurality of user equipments,
wherein the determining of an operating parameter of the optical transmitter uses a change in value of signal quality parameters for a same user equipment, and signal quality parameters are inversely weighted based on their change in value,
wherein the operating parameter of the optical transmitter is a modulation parameter comprising modulation depth of the optical transmitter,
wherein a signal quality parameter of the received signal quality parameters is based on the optical transmitter and on a wireless channel between a user equipment of the plurality of user equipments and the base station, and
wherein the signal quality parameter is indicative of an end-to-end channel quality.

* * * * *

UNITED STATES PATENT AND TRADEMARK OFFICE
CERTIFICATE OF CORRECTION

PATENT NO. : 10,707,962 B2
APPLICATION NO. : 15/754456
DATED : July 7, 2020
INVENTOR(S) : Gianmarco Bruno et al.

It is certified that error appears in the above-identified patent and that said Letters Patent is hereby corrected as shown below:

On the Title Page

"(72) Inventors: Gianmarco Bruno, Genoa (IT); Luca Giorgi, Pisa (IT); Jeroen Nijhof, Genoa (IT); Filippo Ponzini, Pisa (IT)"
Should read:
-- (72) Inventors: Gianmarco Bruno, Genova (IT); Luca Giorgi, Pisa (IT); Jeroen Nijhof, Genova (IT); Filippo Ponzini, Pisa (IT) --.

Signed and Sealed this
Twentieth Day of October, 2020

Andrei Iancu
*Director of the United States Patent and Trademark Office*